United States Patent
Bonifas

(10) Patent No.: US 6,898,753 B2
(45) Date of Patent: May 24, 2005

(54) COMMUNICATION SYSTEM, RECEIVER, AND METHOD OF ESTIMATING ERRORS CAUSED BY A CHANNEL

(75) Inventor: Jean-Luc Bonifas, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 547 days.

(21) Appl. No.: 09/891,493

(22) Filed: Jun. 26, 2001

(65) Prior Publication Data

US 2002/0016939 A1 Feb. 7, 2002

(30) Foreign Application Priority Data

Jun. 27, 2000 (FR) .............................. 00 08267

(51) Int. Cl.[7] .............................................. H03M 13/00
(52) U.S. Cl. ..................... 714/774; 714/704; 455/69
(58) Field of Search .............................. 714/774, 704, 714/708; 455/69

(56) References Cited

U.S. PATENT DOCUMENTS

| | | | | |
|---|---|---|---|---|
| 4,979,174 A | * | 12/1990 | Cheng et al. ............... | 714/774 |
| 5,511,079 A | * | 4/1996 | Dillon ......................... | 714/774 |
| 5,828,672 A | * | 10/1998 | Labonte et al. ............. | 714/708 |
| 6,072,990 A | * | 6/2000 | Agrawal et al. ............. | 455/69 |
| 6,591,382 B1 | * | 7/2003 | Molloy et al. .............. | 714/704 |

* cited by examiner

*Primary Examiner*—Albert Decady
*Assistant Examiner*—John P. Trimmings

(57) ABSTRACT

The invention relates to a receiver which forms part of a communication system and receives data frames through a communication channel which is subject to disturbances, said receiver carrying out an estimation of the maximum error rate and minimum error rate caused by the communication channel. The receiver in a first time period verifies the validity of the received data frames so as to detect and identify the received erroneous data frames and the received correct data frames. Subsequently, the receiver proceeds to correct those received erroneous data frames which can be corrected, so as to generate corrected data frames. The erroneous bits are detected through a bit-by-bit comparison of the erroneous data frames 302 and the corresponding corrected data frames 303, which are added together and then averaged over the total number of bits nb_total_bits received by the receiver so as to obtain a minimum error rate for the transmission. The invention also enables an estimation of a maximum value for the error rate of the received data by adding together the number of bits contained in those data frames 301 which cannot be corrected.

10 Claims, 4 Drawing Sheets

Figure 1:
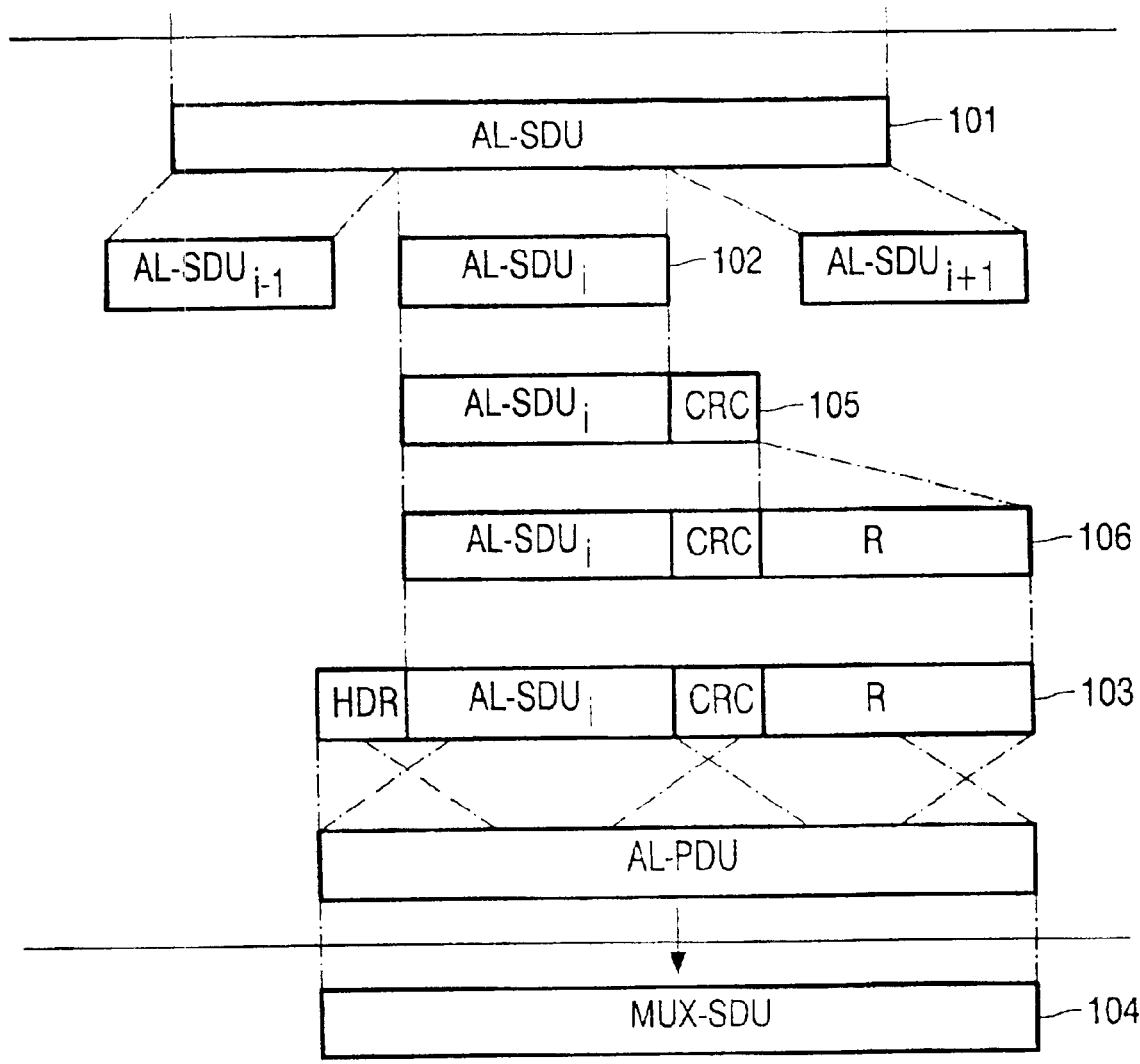

COMMUNICATION SYSTEM, RECEIVER, AND METHOD OF ESTIMATING ERRORS CAUSED BY A CHANNEL

The invention relates to a receiver for receiving and processing data frames transmitted over a transmission channel, comprising:

verification means for verifying the validity of data frames received, for detecting and identifying non-erroneous and erroneous data frames among the data frames received, said erroneous data frames being of a corrigible or incorrigible nature, correction means for correcting errors, which means act on corrigible erroneous received data frames so as to generate corrected data frames.

It also relates to a communication system for transmitting data frames between a transmitter and a receiver of the type described above through a communication channel.

It has numerous applications in communication systems for spoken words and multimedia data in general, as is the case in particular in videophone applications in mobile or wired networks.

U.S. Pat. No. 5,511,079 describes a system for controlling the error protection of data transmitted between a transmission station and a reception station via a bidirectional satellite transmission path. The transmission station carries out an adaptation of the error protection of the transmitted data on the basis of the value of signals representing the propagation and attenuation conditions of the transmitted signals. For this purpose, a method is utilized which renders it possible to estimate indirectly the error rate of the received data at the receiver level. The error protection means used, of the FEC type (Forward Error Correction, which denotes the entire field of correction codes such as convolution codes or block codes), are thus adapted to said propagation and attenuation conditions such that the error rates of the data received by the receiver will not exceed a given value. The transmission station estimates the attenuation of the signals sent to the receiver station on the basis of the signal-to-noise ratio of a first return signal coming from the receiver and on the basis of the signal-to-noise ratio of a second return signal received under optimum transmission conditions.

The method of estimating the error rate of the data transmitted to the receiver used in the prior art document has a number of disadvantages.

Firstly, the estimation of the error rate is based on a relative calculation which uses a reference value of a signal-to-noise ratio measured under optimum transmission conditions, so that an uncertainty remains as regards the estimated error rates, because it is difficult to characterize reliably what is an "optimum transmission condition".

Secondly, the estimation of the error rate by means of measurements of the signal-to-noise ratio is not reliable in the sense that the attenuation of a data carrier signal is not always significant for the presence of errors or for the loss of data. This may lead to an overestimation of the error rate, and thus to an overprotection of the transmitted data, leading to an overloading or saturation of the transmission channel.

Finally, the calculation of the signal-to-noise ratios requires a considerable power and considerable calculation means, so that this estimation method for the error rates is not only expensive but also leads to a considerable amount of equipment which excludes its use in portable applications or appliances.

The invention has for its object to eliminate to a high degree the above disadvantages by proposing a communication system, a receiver, as well as a method of estimating the errors caused by the communication channel which is more reliable and less expensive than the one described in the prior art document.

To achieve this object, the present invention is characterized in that the receiver comprises:

comparison means for comparing received erroneous data frames with corresponding corrected data frames for estimating a minimum error rate involved in the transmission of the received data frames, analysis means for analyzing incorrigible erroneous received data frames for estimating a maximum error rate involved in the transmission of the received data frames, transmission means for transmitting information relating to said minimum and maximum error rates to a remote device.

The invention takes advantage of the FEC type error protection applied to data or data frames transmitted between a transmitter and a receiver. The receiver in a first period carries out the verification of the validity of the received data frames for detecting and identifying frames of non-erroneous data and frames of erroneous data among the data frames received. Then the receiver proceeds to correct errors in the corrigible erroneous data frames received, i.e. in those data frames which do not contain any errors which the FEC correction device is incapable of correcting, so as to generate corrected data frames. The erroneous bits are detected through a bit-by-bit comparison of the erroneous data frames and the corresponding corrected data frames, are added together, and are subsequently averaged over the total number of bits received by the receiver so as to obtain a minimum transmission error rate. This comparison is carried out only on erroneous data frames for which a correction is possible. The error rate calculated by means of this comparison thus underestimates the actual error rate of the received data, which is why this referred to as the minimum error rate. This comparison mainly utilizes a binary operator of the "EXCLUSIVE OR" type, which is commercially available in the field of integrated logic circuits, so that the calculation means necessary for carrying out this bit-by-bit comparison are strongly reduced.

The present invention also enables an estimation of a maximum error rate value for the received data, i.e. an estimation of a value overestimating the real error rate of the data received by the receiver. For each data frame detected as being incorrigible, i.e. for those data frames which still contain errors which the FEC correction device cannot correct, the bits defining said frame are added to the number of corrected bits belonging to the other frames of received data. An average value for the total number of bits received by the receiver is thus obtained for estimating a maximum error rate of the data received by the receiver.

It is possible in this manner to estimate a framework within which the real error rate of the data received by the receiver must lie with the use of limited and compact means.

The invention finally relates to a communication system of the radiotelephony type between a transmitter and a receiver whose operation can benefit from the possibilities of estimating the minimum and maximum error rates as described above. The invention in fact provides means for transmitting information relating to said minimum and maximum error rates of the receiver to said transmitter such that the latter can adapt the protection of the data sent to the receiver. The transmitter thus controls the redundancy level of the data sent in a manner adapted to the error rate caused by the transmission channel. The compromise between the occupation of the passband of the transmission channel and the error rate of the data received by the receiver is thus an optimum.

Figure 2:
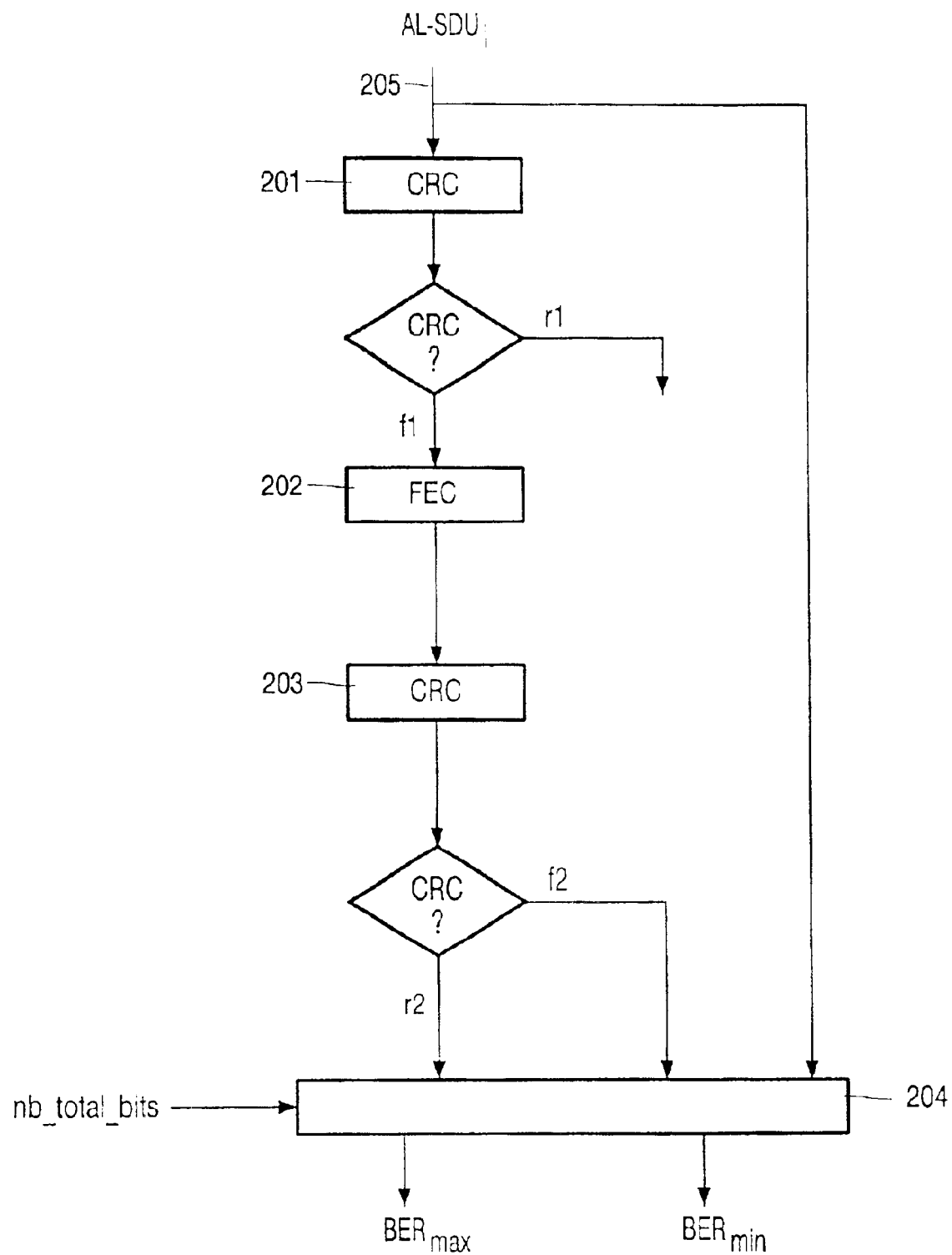
Figure 3:
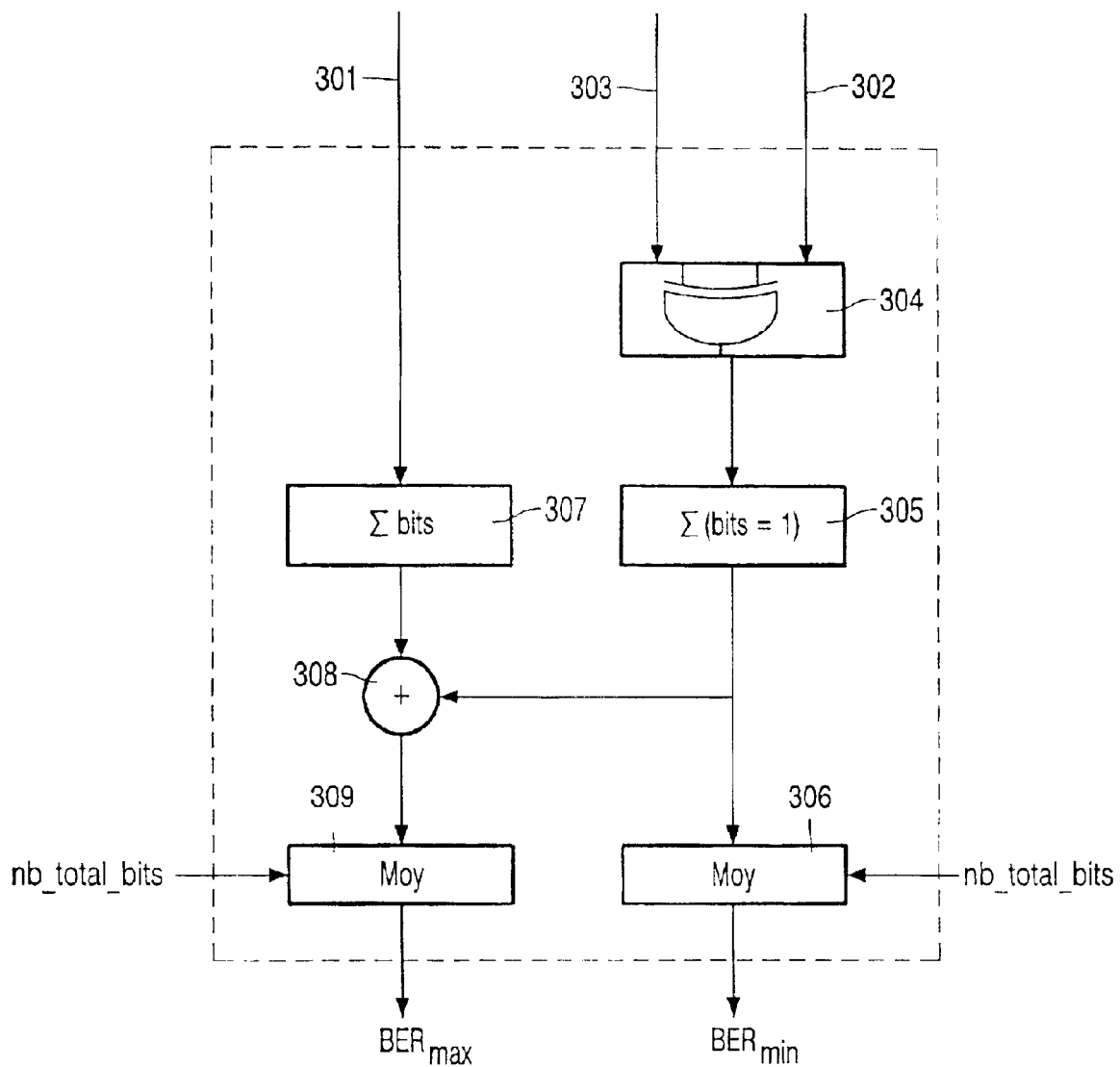
Figure 4:
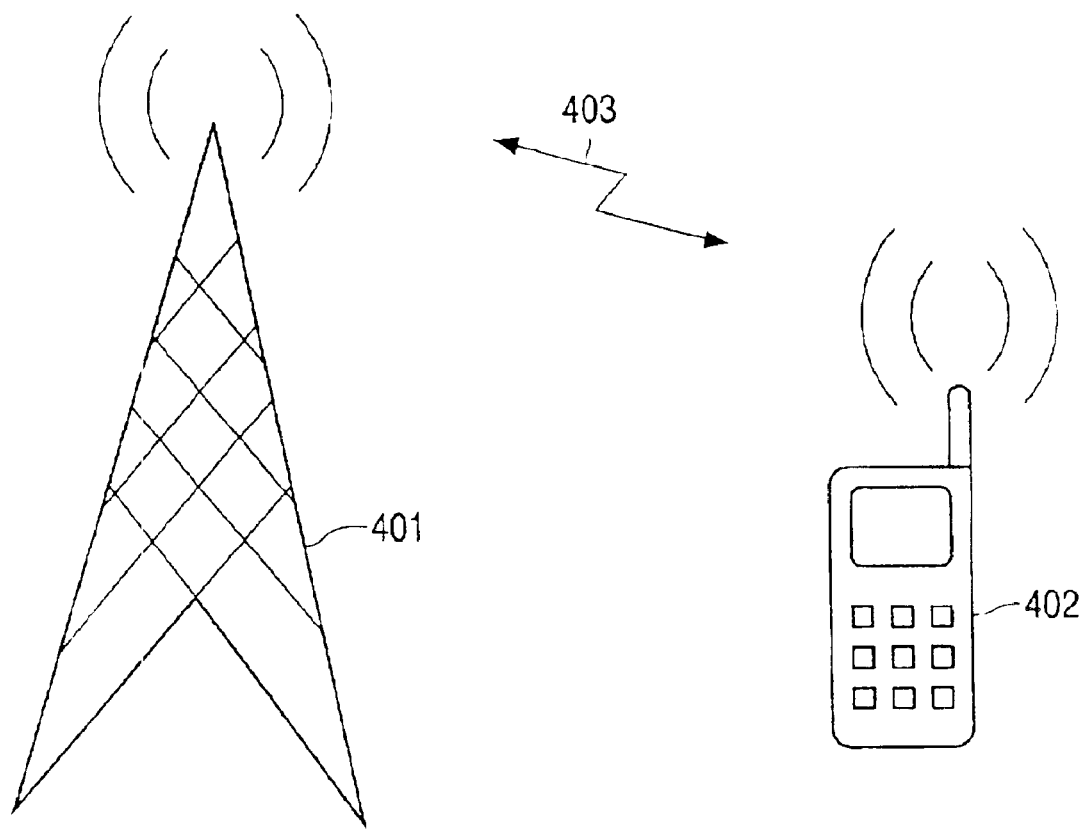

These as well as other, more detailed aspects of the invention will become clearer from the following description of several embodiments of the invention, which are given by way of example only and to which the invention is not limited, with reference to the annexed drawings, in which:

FIG. 1 is a diagram of the encoding principle applied to data frames sent by a transmitter and received by a receiver, FIG. 2 is an operational diagram depicting the sequence of the various operations which contribute to the invention, FIG. 3 is an operational diagram depicting the sequence of individual operations constituting the invention, and FIG. 4 is a diagram representing a communication system comprising a receiver according to the invention.

FIG. 1 diagrammatically shows the encoding principle for data frames sent by a transmitter and received by a receiver of the type described above. The explanations are given in relation to the ITU-H.324/M standard, but it will be obvious to those skilled in the art that the invention may equally well be used in conjunction with other communication standards, such as those of the H.32i series. The ITU-H.324/M standard designed for the communication between a transmitter and a mobile receiver is based in particular on the H.223 standard which governs the performance of the various multiplexing tasks through its four annexes A-B-C-D. These annexes render possible the transmission of multimedia data such as data of the video image and/or audio type over transmission channels which may be subject to disturbances, which may then be the source of the generation of errors in said data transmitted to the receiver. The annexes C and D permit of an increase in the imperviousness to errors by applying to the data to be transmitted an algorithm of the FEC type (Forward Error Correction). For this purpose, the data to be transmitted, defined by AL-SDU (Adaptation Layer Service Data Unit) and referenced 101 are first segmented into frames of elementary data of variable width AL-SDU$_i$ referenced 102. Cyclic redundancy verification data CRC (Cyclic Redundancy Check) are then associated with each data frame AL-SDU$_i$, and the totality 105 of data thus formed is subsequently encoded in accordance with a RCPC (Rate Compatible Punctured Convolutional) or Reed-Solomon type code. In a next step, redundancy data R are concatenated with the data previously encoded, with the object of reconstructing any data lost during transmission. The addition of a header HDR to the data 106 thus formed renders it possible to obtain data frames of the AL-PDU type (Adaptation Layer Protocol Data Unit) referenced 103 and destined to be transmitted to the receiver after a multiplexing operation so as to deliver data frames of the MUX-SDU type referenced 104.

FIG. 2 is an operational diagram depicting the sequence of individual operations which contribute to the invention.

The data CRC, typical of initial data transmitted by the transmitter, allow a verification of the validity of the data frames AL-SDU$_i$ received at the level of the receiver after demultiplexing of the data frames MUX-SDU: the data CRC used constitute an auto-validation of the received data frames. Thus, if the verification CRC referenced 201 carried out on the incoming data AL-SDU$_i$ referenced 205 leads to a positive result, cf. arrow r1, it is possible to decode the transmitted data without any particular precaution because no error has affected the corresponding data frame during the transmission. In the context of the invention, where the object is to estimate the minimum and maximum error rates for the transmitted data, this type of data frame is not taken into consideration except for incrementing the total number of bits received by the receiver. It is only the data frames in which at least one error has been detected by the operation 201 which are taken into account for the cumulative addition of the errors. So if the verification 201 leads to a negative result, cf. arrow f1, this means that an alteration and introduction of errors have taken place in the data sent by the transmitter through the transmission channel. The corresponding data frame AL-SDU$_i$ is then processed in 202 for the purpose of correction. To achieve this, the individual steps of the algorithm FEC are carried out with the use of the redundancy data R which are simultaneously sent for the correction of the detected errors. After this correction 202, a verification operation carried out on the frame thus corrected 203 is necessary for judging the result of this correction. This verification is carried out through the application of the auto-verification code CRC to the corrected data frame. Two possibilities then arise in the Figure:

the verification 203 leads to an incorrect result, cf. arrow f2. This is the case, for example, if a huge amount of errors has been introduced, or a considerable quantity of data has been lost during the transmission over the communication channel. In this case, the corresponding data frame AL-SDU$_i$ is considered definitely incorrigible, and all bits forming part thereof are considered to be errors, the verification 203 leads to a correct result, cf. arrow r2. This means that it was possible to reconstruct the initial data frames on the basis of the erroneous data frames received through the use of the redundancy data R.

The module 204, which has the function of determining the rates $BER_{min}$ and $BER_{max}$, subsequently analyzes three types of signals so as to quantify the transmission errors:

the data frames in which all bits are considered to be errors: these frames contribute to the calculation of a maximum error rate $BER_{max}$ of the data received at the level of the receiver, the data frames comprising at least one error and the corresponding corrected data frames: these frames contribute to the calculation of a minimum error rate $BER_{min}$ of the data received at the level of the receiver. To achieve that the minimum and the maximum error rate correspond to average values, the cumulative error values described above are averaged over the total number of bits nb_total_bits received at the level of the receiver, this total number nb_total_bits being obtained not only through addition of the bits belonging to the non-erroneous frames but also of the bits belonging to the erroneous frames.

FIG. 3 is a diagram depicting the individual processes necessary for estimating said error rates $BER_{min}$ and $BER_{max}$. In the context of a communication between a transmitter and a receiver, these individual operations are carried out at the receiver level through an analysis of the received incorrigible erroneous data frames 301, the received erroneous data frames 302, and the corresponding corrected data frames 303.

To estimate a minimum error rate for the received data, a binary comparison 304 is made between the received erroneous data frames 302 and the corresponding corrected data frames 303. This comparison has for its object to determine the number of erroneous bits contained in each of the data frames 303. Once these data frames have been corrected, it is then possible to carry out a binary operation of the "EXCLUSIVE OR" type for obtaining a binary word in which the bits which were corrected have a "high" level. The number of errors received in each data frame 302 is thus directly obtained by the summing device 305 of the bits having the "high" level. In a final time period, an average for the number of errors thus cumulated averaged over the total number of bits received nb_total_bits at the receiver level is calculated in 306 for delivering the value of a minimum error rate $BER_{min}$ of the received data, said total number nb_total_bits being obtained not only through addition of the bits belonging to non-erroneous frames but also the bits belonging to erroneous frames.

To estimate a maximum error rate of the received data, an analysis of the incorrigible erroneous data frames 301 is made. The latter sometimes cannot be corrected, for example on account of the too high number of errors contained in these frames. If that is the case, all bits of these frames are considered to be erroneous. The operation 307 thus adds together the number of bits contained in each data frame 301. An addition operation 308 between the number of erroneous bits present in the data frames 302 and the number of erroneous bits of the frames 301 renders it possible to obtain an upper value for the real number of errors in the data transmitted over the communication channel. In a final time period, an average value is achieved in 309 between the number of errors thus cumulated and the total number of bits received nb_total_bits at the receiver level so as to supply the value of a maximum error rate $BER_{max}$ of the received data, said total number nb_total_bits being obtained not only through addition of the bits belonging to non-erroneous frames but also the bits belonging to frames with errors.

A framework is thus obtained for the real error rate caused by the transmission channel, which framework is more reliable in proportion as there are fewer incorrigible data frames, because this means that it is possible to detect and correct isolated errors in the erroneous data frames. It may nevertheless happen that the CRC fails in its detection when the frame comprises several incorrect data. In that case all bits of the relevant frame are considered to be erroneous. Nevertheless, the probability of non-detection being lower as the length of the CRC code is greater, it is found in practice that the major portion of the erroneous bits can be individually detected with a CRC code with a length of 16 bits. The present invention leads to remarkable results while still remaining economical.

FIG. 4 is a diagram depicting a communication system comprising a transmitter 401 and a receiver 402 according to the invention. The transmitter, here corresponding to a base station, sends data frames encoded in accordance with the principle described in FIG. 1 through a communication channel 403, which may be subject to disturbances and thus may introduce errors into the data sent by the transmitter as a result. At the receiving end, the receiver detects the erroneous data frames so as to correct them by means of redundancy data which are also contained in said frames. Simultaneously, according to the invention, an estimate is made of the minimum error rate $BER_{min}$ and the maximum error rate $BER_{max}$ so as to determine a framework for the real error rate in the communication channel. Once determined, this information $BER_{min}$ and $BER_{max}$ are directly or indirectly sent to the transmitter so that the latter adapts them at the redundancy level of the data transmitted towards the receiver so as to eliminate the errors caused by the channel. Two solutions are conceivable for this:

either the values $BER_{min}$ and $BER_{max}$ are directly sent to the transmitter via a "proprietary" protocol, or the values $BER_{min}$ and $BER_{max}$, are sent indirectly via a protocol system of the H.245 type which is in charge of the exchange of messages between different terminals. In this case, the values $BER_{min}$ and $BER_{max}$ are converted in a first time period into a minimum redundancy rate and a maximum redundancy rate, respectively, which redundancy rates are finally sent to the transmitter via a protocol of the H.245 type. Once received at the transmitter side, these redundancy rates, minimum and maximum, render it possible to define a redundancy level which is to be applied to the data frames sent to the receiver, for example by opting for an intermediate value between said minimum and maximum rates.

In this type of communication, the error rates $BER_{min}$ and $BER_{max}$ may be estimated at the start of each communication, or alternatively periodically so that the transmitter has the most significant error rates at its disposal before the transmission of the data.

A communication system, a receiver, and the individual steps for estimating the minimum and maximum error rates caused by the communication channel have thus been described and illustrated. Obviously, numerous modifications may be applied to the embodiments described above without departing from the scope of the invention; it is in particular possible to use said minimum and maximum error rates only at the receiver level.

What is claimed is:

1. A receiver for receiving and processing data frames transmitted over a transmission channel, comprising:

a) verification means for verifying the validity of data frames received, for detecting and identifying non-erroneous and erroneous data frames among the data frames received, said erroneous data frames being of a corrigible or incorrigible nature, b) correction means for correcting errors, which means act on corrigible erroneous received data frames so as to generate corrected data frames, characterized in that it comprises:

c) comparison means for comparing received erroneous data frames with corresponding corrected data frames for estimating a minimum error rate involved in the transmission of the received data frames, d) analysis means for analyzing incorrigible erroneous received data frames for estimating a maximum error rate involved in the transmission of the received data frames, e) transmission means for transmitting information relating to said minimum and maximum error rates to a remote device.

2. A receiver as claimed in claim 1, characterized in that the comparison means comprise a binary bit-by-bit operator of the "EXCLUSIVE OR" type applied between the received erroneous data frames and the corresponding corrected data frames, so as to generate an output word indicative of the number of corrected bits contained in said corrected data frames.

3. A receiver as claimed in claim 1, characterized in that the analysis means for analyzing the received incorrigible erroneous data frames comprise:

a) a summation device for indicating the number of bits contained in said incorrigible data frames, b) an adder device for adding the number of corrected bits contained in the corrected data frames to said number of bits contained in the incorrigible data frames.

4. A receiver as claimed in claim 1 comprising a telephone equipment.

5. A communication system for transmitting data frames between a transmitter and a receiver via a communication channel, said transmitter comprising protection means for protecting transmitted frames, while said receiver comprises:

a) verification means for verifying the validity of data frames received, for detecting and identifying non-erroneous and erroneous data frames among the data frames received, said erroneous data frames being of a corrigible or incorrigible nature, b) correction means for correcting errors, which means act on corrigible erroneous received data frames so as to generate corrected data frames, characterized in that the receiver comprises:

c) comparison means for comparing received erroneous data frames with corresponding corrected data frames for estimating a minimum error rate involved in the transmission of the received data frames, d) analysis means for analyzing incorrigible erroneous received data frames for estimating a maximum error rate involved in the transmission of the received data frames, e) transmission means for transmitting information relating to said minimum and maximum error rates to a remote device.

6. A communication system as claimed in claim 5, characterized in that the transmitter comprises adaptation means for adapting the protection of the frames transmitted to the receiver to said minimum and maximum error rates.

7. A method of estimating errors at the level of a receiver for estimating the errors on a transmission channel, which method comprises:

a) a verification step for verifying the validity of the received data frames so as to detect and identify the erroneous data frames received and the non-erroneous data frames received, b) an error correction step carried out on those received erroneous data frames which can be corrected so as to generate corrected data frames, characterized in that it comprises the following steps:

c) a comparison step for comparing received erroneous data frames with corresponding corrected data frames so as to estimate a minimum error rate involved in the transmission of the received data frames, d) an analysis step for analyzing received incorrigible erroneous data frames so as to estimate a maximum error rate involved in the transmission of the received data frames.

8. A method as claimed in claim 7, characterized in that said comparison step comprises a binary bit-by-bit operation of the (EXCLUSIVE OR) type applied between the received erroneous data frames and the corresponding corrected data frames so as to generate an output word indicative of the number of corrected bits contained in said frames of corrected data.

9. A method as claimed in claim 7, characterized in that the analysis step for analyzing the received incorrigible erroneous data frames comprises:

a) a summation sub-step indicating the number of bits contained in said incorrigible data frames, b) an addition sub-step for adding the number of corrected bits contained in the corrected data frames to the number of bits contained in the incorrigible data frames.

10. An error protection method for data frames transmitted between a transmitter and a receiver via a communication channel, said transmitter comprising a protection step for the transmitted frames, while said receiver comprises:

a) a verification step for verifying the validity of the received data frames so as to detect and identify the received erroneous data frames and the received non-erroneous data frames, b) an error correction step carried out on those received erroneous data frames which can be corrected so as to generate corrected data frames, characterized in that:

c) the receiver comprises a comparison step for comparing received erroneous data frames with corresponding corrected data frames so as to estimate a minimum error rate involved in the transmission of the received data frames, d) the receiver comprises an analysis step for analyzing received incorrigible erroneous data frames so as to estimate a maximum error rate involved in the transmission of the received data frames, e) the receiver comprises a transmission step for transmitting said minimum and maximum error rates to said transmitter, f) the transmitter comprises an adaptation step in which the protection of the frames transmitted to the receiver is adapted to said minimum and maximum error rates.

* * * * *